United States Patent
Tong et al.

(10) Patent No.: US 6,281,314 B1
(45) Date of Patent: Aug. 28, 2001

(54) COMPOSITIONS FOR USE IN THE FABRICATION OF CIRCUIT COMPONENTS AND PRINTED WIRE BOARDS

(75) Inventors: Quinn K. Tong, Belle Mead; Bodan Ma, Weehawken; Chaodong Xiao, East Hanover, all of NJ (US)

(73) Assignee: National Starch and Chemical Investment Holding Corporation, Wilmington, DE (US)

( * ) Notice: Subject to any disclaimer, the term of this patent is extended or adjusted under 35 U.S.C. 154(b) by 0 days.

(21) Appl. No.: 09/336,324

(22) Filed: Jun. 18, 1999

Related U.S. Application Data

(60) Provisional application No. 60/091,490, filed on Jul. 2, 1998.

(51) Int. Cl.$^7$ .................................................. C08F 122/40
(52) U.S. Cl. ..................... 526/262; 526/258; 526/259; 526/261
(58) Field of Search .................... 526/258, 259, 526/261, 262

(56) References Cited

U.S. PATENT DOCUMENTS

| | | | |
|---|---|---|---|
| 3,403,172 | 9/1968 | Jordan et al. | 260/404.5 |
| 4,311,636 | 1/1982 | Hahn et al. | 260/45.8 |
| 4,336,311 | 6/1982 | Lucey | 428/521 |
| 4,485,218 | 11/1984 | Bell et al. | 525/257 |
| 4,533,975 | 8/1985 | Bill | 361/323 |
| 4,540,650 | 9/1985 | Klug et al. | 430/192 |
| 4,613,637 | 9/1986 | Landis et al. | 524/105 |
| 4,623,559 | 11/1986 | Hudock | 427/54.1 |
| 4,663,424 | 5/1987 | Stix et al. | 528/182 |
| 4,720,445 | 1/1988 | Brahim et al. | 430/192 |
| 4,826,995 | 5/1989 | Alexander et al. | 548/521 |
| 4,876,358 | 10/1989 | Alexander | 548/521 |
| 4,980,436 | 12/1990 | Saito et al. | 526/261 |
| 4,999,136 | 3/1991 | Su et al. | 252/512 |
| 5,017,406 | 5/1991 | Lutz | 427/54.1 |
| 5,137,936 | 8/1992 | Akiguchi et al. | 522/170 |
| 5,258,426 | 11/1993 | Uchida et al. | 523/435 |
| 5,272,377 | 12/1993 | Shimozawa et al. | 257/787 |
| 5,314,950 | 5/1994 | Singh et al. | 525/73 |
| 5,347,258 | 9/1994 | Howard et al. | 338/333 |
| 5,426,008 | 6/1995 | Hagiwara et al. | 430/18 |
| 5,532,296 | 7/1996 | Recker et al. | 523/400 |
| 5,602,205 | 2/1997 | Singh et al. | 525/282 |
| 5,627,222 | 5/1997 | Recker et al. | 523/400 |
| 5,726,391 | 3/1998 | Iyer et al. | 174/52.2 |
| 5,760,337 | 6/1998 | Iyer et al. | 174/52.2 |
| 5,863,664 | 1/1999 | McCormick et al. | 428/500 |

FOREIGN PATENT DOCUMENTS

| | | | |
|---|---|---|---|
| 0 028 994 A2 | 5/1981 | (EP) | H01L/23/28 |
| 0 051 165 | 5/1982 | (EP) | H01L/23/14 |
| 0 357 110 | 3/1990 | (EP) | C09D/151/00 |
| 0 475 655 A2 | 3/1992 | (EP) | C08K/9/10 |
| 1-152174 | 12/1987 | (JP) | C09D/5/44 |
| 4-146984 | 5/1992 | (JP) | C09J/133/08 |
| 10168413 | 6/1998 | (JP) | C09J/9/02 |
| WO 96/07691 | 3/1996 | (WO) | C08G/73/10 |
| WO 97/18254 | 5/1997 | (WO) | C08G/73/12 |

OTHER PUBLICATIONS

Mark A. Smith et al., "Bismaleimide/Vinyl Ether Matrix Copolymers", Department of Chemistry and Center for Macromolecular Science and Engineering, Univ. of Florida, Gainesville, FL (2 pgs.).

Carol K. Sauers, "The Dehydration of N–Arylmaleamic Acids with Acetic Anhydride", The Journal of Organic Chemistry, vol. 34, No. 8, Aug. 1969, pp. 2275–2279.

Robert J. Cotter et al., "The Synthesis of N–Substituted Isomaleimides", vol. 26, Jan. 1961, pp. 10–15.

*Primary Examiner*—Helen L. Pezzuto
(74) *Attorney, Agent, or Firm*—Jane E. Gennaro

(57) ABSTRACT

A curable composition for use in the fabrication and assembly of circuit components and printed wire boards, which may be designed to be reworkable, comprises one or more mono- or polyfunctional maleimide compounds, or one or more mono- or polyfunctional vinyl compounds other than maleimide compounds, or a combination of maleimide and vinyl compounds, with a free-radical initiator or a photoinitiator, and optionally, one or more fillers. The circuit component is formed by applying the curable composition to the printed wire board and curing the composition in situ on the board.

7 Claims, No Drawings

COMPOSITIONS FOR USE IN THE FABRICATION OF CIRCUIT COMPONENTS AND PRINTED WIRE BOARDS

The priority of U.S. provisional application 60/091,490 filed Jul. 2, 1998, is claimed under 35 USC 119(e).

FIELD OF THE INVENTION

This invention relates to organic materials useful in the fabrication and assembly of electronic circuit components and printed wire boards.

BACKGROUND OF THE INVENTION

The complementary components to active microelectronic conductive circuits are resistors, capacitors, and inductors, known as passive components. These components, both the active circuits and the passives, are supported and interconnected on printed wire boards (PWB) in microelectronic devices.

While the integration of active circuit functions using silicon integrated circuits has been a major success, the integration of passive components is still in the developmental stage. Many of the passive components remain discrete, individual components, and often exceed in number by an order of magnitude the number of active integrated circuits on PWBs. This has increased the complexity of the PWBs and decreased the available surface area for other devices. The only alternative in the past has been to increase the size of the printed wire boards.

More recent advances in circuit board design provide for planar components formed on layers of the printed wire board, or for components buried in recesses in the board, resulting in a higher packaging efficiency. This integration of passive components reduces the number of electrical contacts or transitions between the active and passive components, which provides a consequent improvement in electrical performance and a reduction in mechanical stress at these transition points.

The utilization of integral passive components would be particularly advantageous in thin-film packages, and there is a significant effort within the industry to develop organic materials that will function reliably as passive components in microelectronic devices, particularly for thin-film packages. Moreover, as it is expensive to discard printed wire boards, it would be a manufacturing advantage to have an organic material that can be reworked.

In order to achieve the required mechanical performance and desired reworkability, relatively high molecular weight thermoplastics would be the preferred compositions. These materials, however, have high viscosity or even a solid film form, which are drawbacks to the manufacturing process.

Today, one of the primary thrusts within the semiconductor industry is to develop suitable materials for passive components, and particularly materials that would be reworkable.

SUMMARY OF THE INVENTION

This invention is a curable composition for fabricating electronic circuit components, defined herein to be both active and passive components, such as, conductors, resistors, capacitors, and inductors. The composition comprises one or more compounds containing one or more maleimide functionality, or one or more compounds containing one or more vinyl functionality, or a combination of compounds containing maleimide or vinyl functionality, a free-radical initiator and/or a photoinitiator, and optionally one or more fillers.

A compound containing one maleimide functionality will be referred to hereinafter as a mono-functional maleimide compound. A compound containing more than one maleimide functionality will be referred to hereinafter as a poly-functional maleimide compound. A compound containing one vinyl functionality will be referred to hereinafter as a mono-functional vinyl compound. A compound containing more than one vinyl functionality will be referred to hereinafter as a poly-functional vinyl compound. The functionality is defined herein to be a carbon to carbon double bond.

The composition can be designed to be reworkable by choosing a major amount of mono-functional compounds for the composition.

In another embodiment, this invention is a cured composition that results after the curing of the just described curable composition.

In another embodiment, this invention is a circuit component in or on a printed wire board prepared from a composition comprising one or more mono- or polyfunctional maleimide compounds, or one or more mono- or polyfunctional vinyl compounds other than maleimide compounds, or a combination of maleimide and vinyl compounds, a free-radical initiator and/or a photoinitiator, and optionally one or more fillers. As used herein, the use of the word "in" or "on" in connection with printed wire board shall include the other.

In another embodiment, this invention is a method for making an electronic circuit component on a printed wire board from a reworkable curable composition comprising the steps:

(a) providing a curable composition comprising
  (i) one or more mono-functional maleimide compounds, or one or more mono-functional vinyl compounds other than maleimide compounds, or a combination of maleimide and vinyl compounds, in a major amount effective to provide thermoplastic properties, and
  (ii) optionally, one or more poly-functional maleimide compounds, or one or more poly-functional vinyl compounds other than maleimide compounds, or a combination of poly-functional maleimide and vinyl compounds, in a minor amount ineffective to diminish the thermoplastic properties of the cured composition,
  (iii) a curing initiator selected from the group consisting of a free-radical initiator, a photoinitiator, and a combination of those;
  (iv) optionally, one or more fillers; and
  (v) optionally, one or more adhesion promoters;
(b) applying the curable composition to the printed wire board; and
(c) curing the composition in situ.

The ability to process these thermoplastic compositions to form electronic circuit components is achieved by using relatively low molecular weight reactive oligomers or pre-polymers and curing them in situ on the printed wire board substrate. The relatively low molecular weight translates to a lower viscosity and ease of application to the substrate.

DETAILED DESCRIPTION OF THE INVENTION

The maleimide and vinyl compounds used in the compositions for the fabrication of circuit components are curable compounds, meaning that they are capable of polymerization, with or without crosslinking. As used in this specification, to cure will mean to polymerize, with or without crosslinking. Cross-linking, as is understood in the art, is the attachment of two polymer chains by bridges of an element, a molecular group, or a compound, and in general will take place upon heating. As cross-linking density is increased, the properties of a material can be changed from thermoplastic to thermosetting, which consequently increases polymeric strength, heat- and electrical resistance, and resistance to solvents and other chemicals.

It is possible to prepare polymers of a wide range of cross-link density, from tacky, elastomeric to tough glassy polymers, by the judicious choice and amount of mono- or polyfunctional compounds. The greater proportion of polyfunctional compounds reacted, the greater the cross-link density. Consequently, to obtain thermoplastic properties, the compositions of this invention can be prepared from mono-functional compounds to limit the cross-link density. However, a minor amount of poly-functional compounds can be added to provide some cross-linking and strength to the composition, provided the amount of poly-functional compounds is limited to an amount that does not diminish the desired thermoplastic properties. Within these parameters, the strength and elasticity of individual circuit component compositions can be tailored to a particular end-use application.

The cross-link density can also be controlled to give a wide range of glass transition temperatures in the cured circuit component composition to withstand subsequent processing and operation temperatures. For some circuit component compositions, the Tg may be chosen so that the composition will reflow after cure, thus providing the ability to rework the circuit component on the substrate.

In the inventive compositions, the maleimide compounds and the vinyl compounds may be used independently, or in combination. The maleimide or vinyl compounds, or both, will be present in the curable circuit component compositions in an amount from 2 to 98 weight percent based on the organic components present (excluding any fillers).

The compositions will further comprise at least one free-radical initiator, which is defined to be a chemical species that decomposes to a molecular fragment having one or more unpaired electrons, highly reactive and usually short-lived, which is capable of initiating a chemical reaction by means of a chain mechanism. The free-radical initiator will be present in an amount of 0.1–10 percent, preferably 0.1–3.0 percent, by weight of the maleimide or vinyl compound, or a combination of both maleimide and vinyl compounds (excluding any filler). The free radical curing mechanism gives a fast cure and provides the composition with a long shelf life before cure. Preferred free-radical initiators include peroxides, such as butyl peroctoates and dicumyl peroxide, and azo compounds, such as 2,2'-azobis(2-methyl-propanenitrile) and 2,2'-azobis(2-methyl-butanenitrile).

Alternatively, the circuit component compositions may contain a photoinitiator, such as is sold by Ciba Specialty Chemicals under the trademark Irgacure, in lieu of the free-radical initiator, and the curing process may then be initiated by UV radiation. The photoinitiator will be present in an amount of 0.1 to 10 percent, preferably 0.1 to 3.0 percent, by weight of the maleimide or vinyl compound, or a combination of both maleimide and vinyl compounds (excluding any filler). In some cases, both photoinitiation and free-radical initiation may be desirable. For example, the curing process can be started by UV irradiation, and in a later processing step, curing can be completed by the application of heat to accomplish a free-radical cure.

In general, these compositions can be cured within a temperature range of 80° to 180° C., and curing will be effected within a length of time of about 5 minutes to 4 hours. As will be understood, the time and temperature curing profile for each composition will vary, and different compositions can be designed to provide the curing profile that will be suited to the particular industrial manufacturing process.

Ease of application, even when thermoplastic properties are desired for the circuit component, is achieved by using relatively low molecular weight reactive oligomers or pre-polymers and curing these in situ after application to the substrate on which the circuit component is to be formed. Applying the materials in an uncured state gives high processibility, and the resultant cured composition provides high mechanical performance.

Circuit components can include resistors, conductors, inductors, dielectrics, capacitors, and combinations of these. It will be understood that all resistors necessarily exhibit some conductance, and all conductors exhibit some resistance, and that resistors and conductors form a continuum of resistance and conductance depending on the specific property of the individual component. This continuum is also the case for dielectrics and capacitors. A dielectric may function as a true dielectric or isolating component, or as a capacitor, depending on the specific dielectric constant for the component. By the judicious choice of filler, these compositions can be formulated to give a broad range of resistivity, conductivity, capacitance, or dielectric properties as needed for the specific circuit component.

Providing the precise type and amount of filler for obtaining the electrical properties desired for a specific end use application is within the expertise of one skilled in the art. Exemplary conductive fillers are silver, copper, gold, platinum, palladium. Exemplary resistive fillers are carbon black, carbon fiber, and graphite. Exemplary capacitance fillers are ceramic, barium titanate and titantium dioxide. The fillers will be present typically in an amount of 20 to 90 percent by weight of the total circuit component composition.

By way of example, acceptable commercial values of resistivity for conductive materials are in the range of 0.200 ohms per square or less, and for resistive materials are in the range of 0.005 to 10M ohms per square, as tested by ASTM-D-257.

The components formed from the inventive materials on the printed wire boards will be formed using the techniques for making circuit components and printed wire boards known to those skilled in the art. As will be understood, these components can be those that are designated in the art as planar or buried components, and are formed by using relatively low molecular weight reactive oligomers or pre-polymers and curing these in situ after application to the substrate on which the circuit component is to be formed.

In general, the circuit components are formed in combination with via holes, which are Z directional, present in the printed circuit boards for interconnecting surface devices or components with conductive layers on or in the printed circuit board. The circuit component is formed as a geometric configuration conductively interconnected with the conductive layers in the printed circuit board. The curable circuit component composition is deposited in the configuration by conventional techniques and cured in situ.

As used throughout this specification: the notation C(O) refers to a carbonyl group; when lower case "n" is the integer 1, the compound will be a mono-functional compound; and when lower case "n" is an integer 2 to 6, the compound will be a poly-functional compound.

Maleimide Compounds

The maleimide compounds suitable for use in the circuit component compositions of this invention have a structure represented by the formula: $[M—X_m]_n—Q$, or by the formula: $[M—Z_m]_n—K$. For these specific formulae, when lower case "n" is the integer 1, the compound will be a mono-functional compound; and when lower case "n" is an integer 2 to 6, the compound will be a poly-functional compound.

Formula $[M—X_m]_n—Q$ represents those compounds in which:

M is a maleimide moiety having the structure

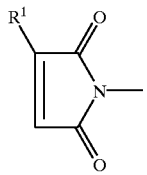

in which $R^1$ is H or $C_1$ to $C_5$ alkyl;

each X independently is an aromatic group selected from the aromatic groups having the structures (I) through (V):

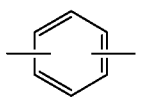
(I)

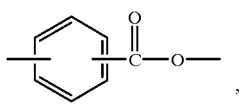
(II)

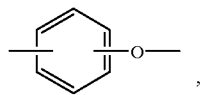
(III)

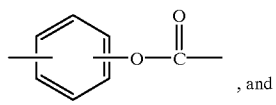
(IV)
, and

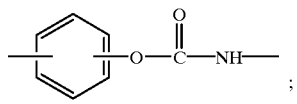
(V)

Q is a linear or branched chain alkyl, alkyloxy, alkyl amine, alkyl sulfide, alkylene, alkyleneoxy, alkylene amine, alkylene sulfide, aryl, aryloxy, or aryl sulfide species having up to about 100 atoms in the chain, which may contain saturated or unsaturated cyclic or heterocyclic substituents pendant from the chain or as part of the backbone in the chain, and in which any heteroatom present may or may not be directly attached to X;

or Q is a urethane having the structure:

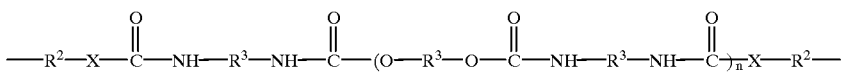

in which each $R^2$ independently is an alkyl, aryl, or arylalkyl group having 1 to 18 carbon atoms; $R^3$ is an alkyl or alkyloxy chain having up to 100 atoms in the chain, which chain may contain aryl substituents; X is O, S, N, or P; and n is 0 to 50;

or Q is an ester having the structure:

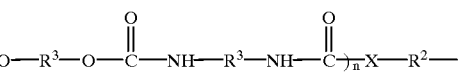

in which $R^3$ is an alkyl or alkyloxy chain having up to 100 atoms in the chain, which chain may contain aryl substituents;

or Q is a siloxane having the structure:

$—(CR^1_2)_e—[SiR^4—O]_f—SiR^4_2—(CR^1_2)_g—$ in which the $R^1$ substituent independently for each position is H or an alkyl group having 1 to 5 carbon atoms and the $R^4$ substituent independently for each position is an alkyl group having 1 to 5 carbon atoms or an aryl group, and e and g are independently 1 to 10 and f is 1 to 50; and m is 0 or 1, and n is 1 to 6.

Preferably, X is structure (II), (III), (IV) or (V), and more preferably is structure (II).

Preferably, Q is a linear or branched chain alkyl, alkyloxy, alkylene, or alkyleneoxy species having up to about 100 atoms in the chain, as described with pendant saturated or unsaturated cyclic or heterocyclic substituents, or a siloxane as described, and more preferably is a linear or branched chain alkyl species or siloxane, as described.

Formula $[M—Z_m]_n—K$ represents those compounds in which

M is a maleimide moiety having the structure

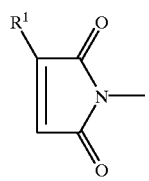

in which $R^1$ is H or $C_1$ to $C_5$ alkyl;

Z is a linear or branched chain alkyl, alkyloxy, alkyl amine, alkyl sulfide, alkylene, alkyleneoxy, alkylene amine, alkylene sulfide, aryl, aryloxy, or aryl sulfide species having up to about 100 atoms in the chain, which may contain saturated or unsaturated cyclic or heterocyclic substituents pendant from the chain or as part of the backbone in the chain, and in which any heteroatom present may or may not be directly attached to K;

or Z is a urethane having the structure:

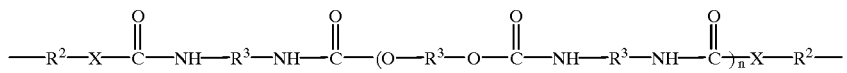

in which each $R^2$ independently is an alkyl, aryl, or arylalkyl group having 1 to 18 carbon atoms; $R^3$ is an alkyl or alkyloxy chain having up to 100 atoms in the chain, which chain may contain aryl substituents; X is O, S, N, or P; and n is 0 to 50;

or Z is an ester having the structure:

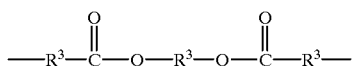

in which $R^3$ is an alkyl or alkyloxy chain having up to 100 atoms in the chain, which chain may contain aryl substituents;

or Z is a siloxane having the structure:
  $-(CR^1_2)_e-[SiR^4_2-O]_f-SiR^4_2-(CR^1_2)_g-$ in which the $R^1$ substituent independently for each position is H or an alkyl group having 1 to 5 carbon atoms and the $R^4$ substituent independently for each position is an alkyl group having 1 to 5 carbon atoms or an aryl group, and e and g are independently 1 to 10 and f is 1 to 50;

K is an aromatic group selected from the aromatic groups having the structures (VI) through (XIII) (although only one bond may be shown to represent connection to the aromatic group K, this will be deemed to represent any number of additional bonds as described and defined by n):

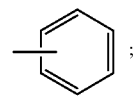
(VI)

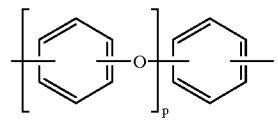
(VII)

in which p is 1 to 100;

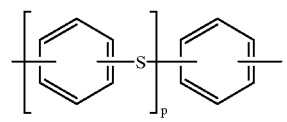
(VIII)

in which p is 1 to 100;

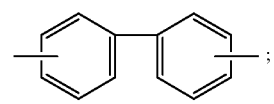
(IX)

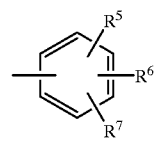
(X)

in which $R^5$, $R^6$, and $R^7$ are a linear or branched chain alkyl, alkyloxy, alkyl amine, alkyl sulfide, alkylene, alkyleneoxy, alkylene amine, alkylene sulfide, aryl, aryloxy, or aryl sulfide species having up to about 100 atoms in the chain, which may contain saturated or unsaturated cyclic or heterocyclic substituents pendant from the chain or as part of the backbone in the chain, and in which any heteroatom present may or may not be directly attached to the aromatic ring; or $R^5$, $R^6$, and $R^7$ are a siloxane having the structure $-(CR^1_2)_e-[SiR^4_2-O]_f-SiR^4_2-(CH_3)_g-$ in which the $R^1$ substituent is H or an alkyl group having 1 to 5 carbon atoms and the $R^4$ substituent independently for each position is an alkyl group having 1 to 5 carbon atoms or an aryl group, and e is 1 to 10 and f is 0 to 50;

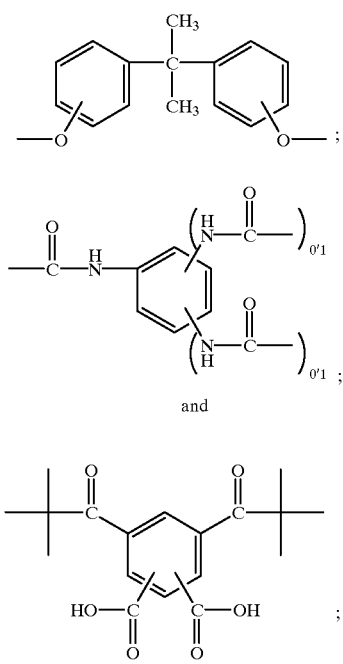

and m is 0 or 1, and n is 1 to 6.

Preferably, Z is a linear or branched chain alkyl, alkyloxy, alkylene, or alkyleneoxy species having up to about 100 atoms in the chain, as described with pendant saturated or unsaturated cyclic or heterocyclic substituents, or a siloxane as described, and more preferably is a linear or branched chain alkyl species or siloxane, as described.

Preferably, K is structure (VII), (X) or (XI), more preferably is structure (X) or (XI), and most preferably is structure (X).

The more preferred maleimide compounds, particularly for use as reworkable materials, are N-butylphenyl maleimide and N-ethylphenyl maleimide.

Vinyl Compounds

The vinyl compounds (other than the maleimides) herein will have the structure:

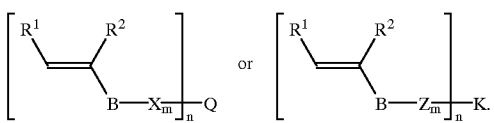

For these specific structures, when lower case "n" is the integer 1, the compound will be a mono-functional compound; and when lower case "n" is an integer 2 to 6, the compound will be a poly-functional compound.

In these structures, $R^1$ and $R^2$ are H or an alkyl having 1 to 5 carbon atoms, or together form a 5 to 9 membered ring with the carbons forming the vinyl group; B is C, S, N, O, C(O), O—C(O), C(O)—O, C(O)NH or C(O)N($R^8$), in which $R^8$ is $C_1$ to $C_5$ alkyl; m is 0 or 1; n is 1–6; and X, Q, Z, and K are as described above.

Preferably, B is O, C(O), O—C(O), C(O)—O, C(O)NH or C(O)N($R^8$); more preferably B is O, C(O), O—C(O), C(O)—O, or C(O)N($R^8$).

Other Composition Components

Depending on the nature of the substrate to which the circuit component composition is to be bonded, the encapsulant may also contain a coupling agent. A coupling agent as used herein is a chemical species containing a polymerizable functional group for reaction with the maleimide and other vinyl compound, and a functional group capable of condensing with metal hydroxides present on the surface of the substrate. Such coupling agents and the preferred amounts for use in compositions for particular substrates are known in the art. Suitable coupling agents are silanes, silicate esters, metal acrylates or methacrylates, titanates, and compounds containing a chelating ligand, such as phosphine, mercaptan, and acetoacetate. When present, coupling agents typically will be in amounts up to 10 percent by weight, and preferably in amounts of 0.1–3.0 percent by weight, of the maleimide and other monofunctional vinyl compound.

In addition, the compositions may contain compounds that lend additional flexibility and toughness to the resultant cured encapsulant. Such compounds may be any thermoset or thermoplastic material having a Tg of 50° C. or less, and typically will be a polymeric material characterized by free rotation about the chemical bonds, such as can be obtained by the presence of carbon-carbon double bonds adjacent to carbon-carbon single bonds, the presence of ester and ether groups, and the absence of ring structures. Suitable such modifiers include polyacrylates, poly(butadiene), polyTHF (polymerized tetrahydrofuran), CTBN (carboxy-terminated butyronitrile) rubber, and polypropylene glycol. When present, toughening compounds may be in an amount up to about 15 percent by weight of the maleimide and other monofunctional vinyl compound.

If siloxane moieties are not part of the maleimide or vinyl compound structure, siloxanes can be added to the circuit component formulations to impart elastomeric properties. Suitable siloxanes are the methacryloxypropyl-terminated polydimethyl siloxanes, and the aminopropyl-terminated polydimethylsiloxanes, available from United Chemical Technologies.

Other additives known and used in the art may also be used for specific purposes, such as, adhesion promoters. The selection of the types and amounts suitable is within the expertise of one skilled in the art.

Another embodiment of this invention includes the maleimides having the formulae [M—$X_m$]$_n$—Q and [M—$Z_m$]$_n$—K as described herein in which Q and Z can be an ester having the structure

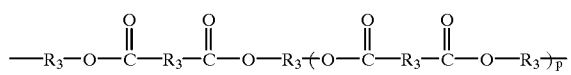

or the structure

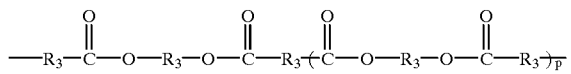

in which p is 1 to 100, each $R^3$ can independently be an alkyl or alkyloxy chain having up to 100 atoms in the chain, which chain may contain aryl substituents, or a siloxane having the structure —$(CR^1{}_2)_e$—[$SiR^4{}_2$—O]$_f$—$SiR^4{}_2$—$(CR^1{}_2)_g$— in which the $R^1$ substituent independently for each position is H or an alkyl group having 1 to 5 carbon atoms, the $R^4$ substituent independently for each position is an alkyl group having 1 to 5 carbon atoms or an aryl group, e and g are independently 1 to 10 and f is 1 to 50.

Another embodiment of this invention includes the vinyl compounds having the structures

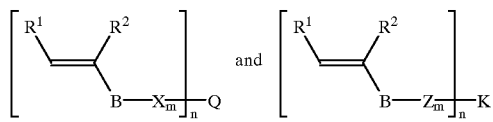

as described herein in which B is C, S, N, O, C(O), C(O)NH or $C(O)N(R^8)$, in which $R^8$ is $C_1$ to $C_5$ alkyl.

Another embodiment of this invention includes the vinyl compounds having the structures

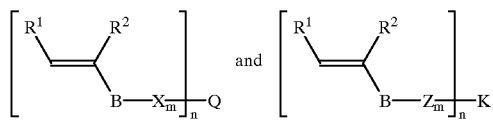

as described herein in which Q and Z can be an ester having the structure

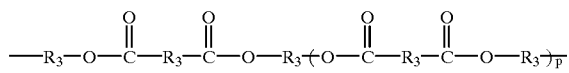

or the structure

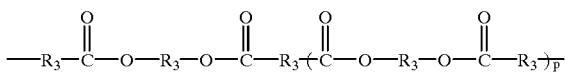

in which p is 1 to 100,
each $R^3$ can independently be an alkyl or alkyloxy chain having up to 100 atoms in the chain, which chain may contain aryl substituents,
or a siloxane having the structure
$-(CR^1_2)_e-[SiR^4_2-O]_f-SiR^4_2-(CR^1_2)_g-$ in which the $R^1$ substituent independently for each position is H or an alkyl group having 1 to 5 carbon atoms, the $R^4$ substituent independently for each position is an alkyl group having 1 to 5 carbon atoms or an aryl group, e and g are independently 1 to 10, and f is 1 to 50.

Another embodiment of this invention includes the composition as described herein containing an anionic or cationic curing initiator. The types and useful amounts of such initiators are well known in the art.

EXAMPLES

Various maleimide and vinyl compounds were prepared and formulated into circuit component compositions. The compositions were investigated for viscosity and thixotropic index for the uncured composition, and for curing profile, glass transition temperature, coefficient of thermal expansion, thermal mechanical analysis, and reworkability for the cured composition.

Example 1
Preparation of Benzamido-endcapped Dimer Diamine Bismaleimide

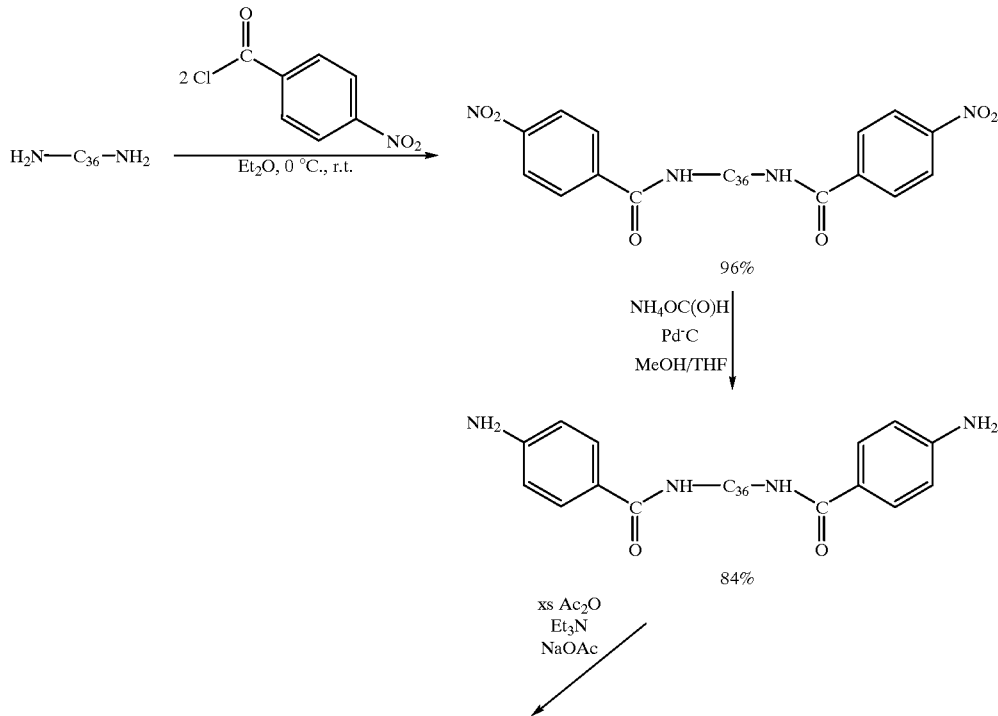

-continued

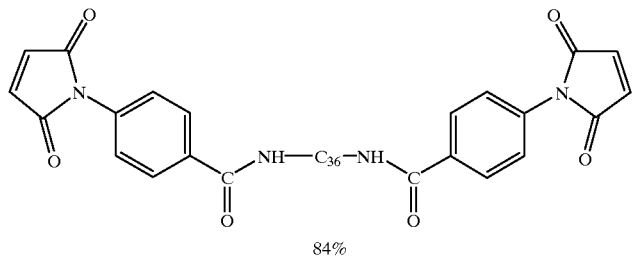

84%

Dimer diamine (sold as Versamine 552 by Henkel, 20.0 g, 37 mmol) was solvated in diethyl ether ($Et_2O$) (200 mL) in a 500 mL three-necked flask equipped with an addition funnel, magnetic stirring, internal temperature probe and nitrogen inlet/outlet. $NaOH_{aq}$ (11.7 mL of 6.25 M solution diluted with 100 mL $H_2O$, 73 mmol) was added with vigorous stirring. This solution was placed under a steady flow of nitrogen and cooled to 3° C. on an ice bath with stirring. The addition funnel was charged with p-nitrobenzoyl chloride (13.6 g, 73 mmol) in $Et_2O$ (50 mL), and this solution was added to the reaction vessel over the course of 60 minutes, maintaining an internal T<10° C. The reaction was stirred at ~3° C. for an additional 60 minutes after this addition was complete, then allowed to warm to room temperature and stirred for another 4 hours. The solution was transferred to a separatory funnel and the isolated organic layer washed with distilled $H_2O$ (300 mL), 5% $HCl_{aq}$ (300 mL), $NaCl_{aq}$ (250 mL) and distilled $H_2O$ (2×250 mL). The organics were isolated, dried over $MgSO_4$ anhyd., filtered and the solvent removed in vacuo to yield the dinitro compound as a viscous yellow oil which exhibited acceptable $^1H$ NMR and IR spectra (30.0 g, 96%).

The dinitro compound described above (5.0 g, 5.9 mmol) was dissolved in methanol (MeOH) (25 mL) and tetrahydrofuran (THF) (5 mL) in a 250 mL three-necked flask equipped with magnetic stirring, reflux condensor and nitrogen inlet/outlet. The solution was placed under nitrogen, and 5% Pd—C (0.96 g) were added with stirring. Ammonium formate (3.4 g, 55 mmol) was added and the reaction stirred at room temperature for 2 hours. Carbon dioxide evolution was immediately observed. The reaction solution was filtered, and bulk filtrate solvent was removed via rotary evaporator. The resulting viscous oil was dissolved in $Et_2O$ (150 mL), washed with distilled $H_2O$ (150 mL), isolated and dried over $MgSO_4$ anhyd. Solvent was removed in vacuo to yield the diamine as a sticky tan oil, which exhibited acceptable $^1H$ NMR and IR spectra (3.9 g, 84%).

Maleic anhydride (0.5 g, 5.1 mmol) was dissolved in acetone (10 mL) in a 250 mL three-necked flask equipped with magnetic stirring, addition funnel and nitrogen inlet/outlet. The solution was cooled on an ice bath and placed under nitrogen. The addition funnel was charged with an acetone (10 mL) solution of the diamine described above (2.0 g, 2.60 mmol), which was added dropwise over 30 minutes. The reaction was stirred for an additional 30 minutes on the ice bath, then allowed to warm to room temperature, and stirred for another 4 hours. To the resulting slurry was added (acetic anhydride) ($Ac_2O$) (1.54 mL, 160 mmol), triethyl amine ($Et_3N$) (0.23 mL, 1.63 mmol) and sodium acetate (NaOAc) (0.16 g, 1.9 mmol). The resulting slurry was heated to mild reflux for 5 hours. The reaction was allowed to cool to room temperature, and solvent removed via rotary evaporator to yield a brown oil. This material was dissolved in $CH_2Cl_2$ (250 mL) and washed with distilled $H_2O$ (200 mL), satd. $NaHCO_3$ (200 mL) and distilled $H_2O$ (200 mL). Emulsions were broken by adding NaCl when necessary. The organic layer was isolated, dried over $MgSO_4$ anhyd. and solvent removed in vacuo to yield the bismaleimide, a brown solid (2.0 g, 83%). The resin exhibited satisfactory $^1H$ NMR, $^{13}C$ NMR and IR spectra, which indicated slight contamination with acetic acid.

Example 2

Preparation of 20-Bismaleimido-10,11-dioctyl-eicosame (and isomers)

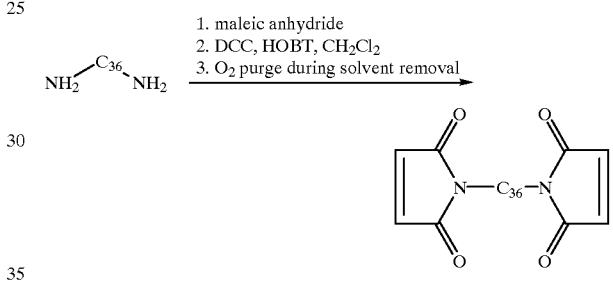

In a 5 L multi-neck flask equipped with a drying tube, thermometer, slow addition funnel , mechanical stirrer and nitrogen purge maleic anhydride (98.06 g, 1.02 equivalents on —$NH_2$) was dissolved in 500 ml tetrahydrofuran (THF). Stirring was begun and the solution was chilled with a dry ice/water bath. Slow addition of dimer diamine (Versamine 552, Henkel, 245.03 g, 0.4477 mol) in 250 ml THF was begun. Addition was carried out over 1 hour. After addition was complete the ice bath was removed and 375 ml of THF was rinsed through the slow addition funnel to incorporate solidified diamine. After one hour the ice bath was replaced around the flask. 1-Hydroxybenzotriazole (96.79 g, 0.80 equivalents on —$NH_2$) was added rinsing into the flask with 50ml THF. When the temperature had reached 5° C. slow addition of dicyclohexylcarbodiimide (DCC) (188.43 g, 1.02 equivalents on —$NH_2$) in 200ml THF was begun. The temperature during addition was kept below ten degrees. After DCC addition was complete the slow addition funnel was rinsed with 80 ml of THF. The ice bath was removed. The reaction was monitored by IR. When it appeared that the isoimide has been converted to maleimide (approximately 4 hours after the completion of DCC addition) the mixture was filtered, rinsing the solids with THF. The orange solution was placed in the freezer overnight.

The solution was removed from the freezer and allowed to warm to room temperature. Hydroquinone (0.0513 g) was added to the solution. A partial strip of the THF was carried out on a rotary evaporator with the temperature maintained below 28° C. The solution was concentrated to approximately 800 ml. Much particulate matter was visible. The solution was placed in freezer overnight.

The mixture was removed from the freezer and allowed to warm. The solids were filtered, rinsing with THF. The filtrate was transferred to a 2 L multi-neck flask equipped with a mechanical stirrer, vacuum line connected to a trap, and a glass tube attached by tubing to a drying tube. The remaining THF was stripped at room temperature by pulling a vacuum and bubbling air through the material while stirring. The resultant thick, creamy-tan colored semi-solid was placed in the freezer overnight.

The semi-solid was removed from the freezer and allowed to warm. The semi-solid was dissolved in 450 ml each of methanol and hexane, and washed with 50% methanol/water (4×250 ml) to remove 1-hydroxybenzotriazole (HOBT). It was attempted to extract the product with hexane. After addition of 300 ml of hexane separation was not observed. The mixture was washed with additional water (3×250 ml). The organic phase was placed in the freezer overnight.

The material was removed from the freezer. Two layers were apparent. The upper layer was clear and yellow in color. The bottom layer was a orange and cloudy. The material was poured cold into a separatory funnel. The top layer was hexane and the desired product. The bottom layer was extracted with hexane (6×200 ml), separation occurred easily. The combined extracts were dried over anhydrous magnesium sulfate and filtered, rinsing the solids with hexane. The solvent was stripped to an approximate volume of 750 ml on a rotary evaporator with the temperature not exceeding 24° C. The remaining solvent was stripped off using a vacuum/air bubbling set-up at room temperature to give the desired product in 67% yield.

Example 3
Preparation of Butadiene-Acrylonitrile Bismaleimide

Amino-terminated butadiene-acrylonitrile (sold as Hycar resin 1300 X42 ATBN by BF Goodrich, in which the m and n depicted in the structure are integers to provide a number average molecular weight of 3600) (450 g, 500 mmol based on amine equivalent weight AEW=450 g) was dissolved in $CHCl_3$ (1000 mL) in a 3 L four-necked flask equipped with addition funnel, mechanical stirrer, internal temperature probe and nitrogen inlet/outlet. The stirred solution was placed under nitrogen and cooled on an ice bath. The addition funnel was charged with maleic anhydride (98.1 g, 1 mol) in $CHCl_3$ (50 mL) and this solution was added to the reaction over 30 minutes, maintaining the internal reaction temperature below 10° C. This mixture was stirred for 30 minutes on ice, then allowed to warm to room temperature and stirred for an additional 4hours. To the resulting slurry was added acetic anhydride ($Ac_2O$) (653.4 g, 6 mol), triethylamine ($Et_3N$) (64.8 g, 0.64 mol) and NaOAc (62.3 g, 0.76 mol). The reaction was heated to mild reflux for 5 hours, allowed to cool to room temperature, and subsequently extracted with $H_2O$ (1 L), satd. $NaHCO_3$ (1 L) and $H_2O$ (2×1 L). Solvent was removed in vacuo to yield the maleimide terminated butadiene acrylonitrile.

Example 4

Preparation of Tris(maleimide) Derived From Tris(epoxypropyl)isocyanurate

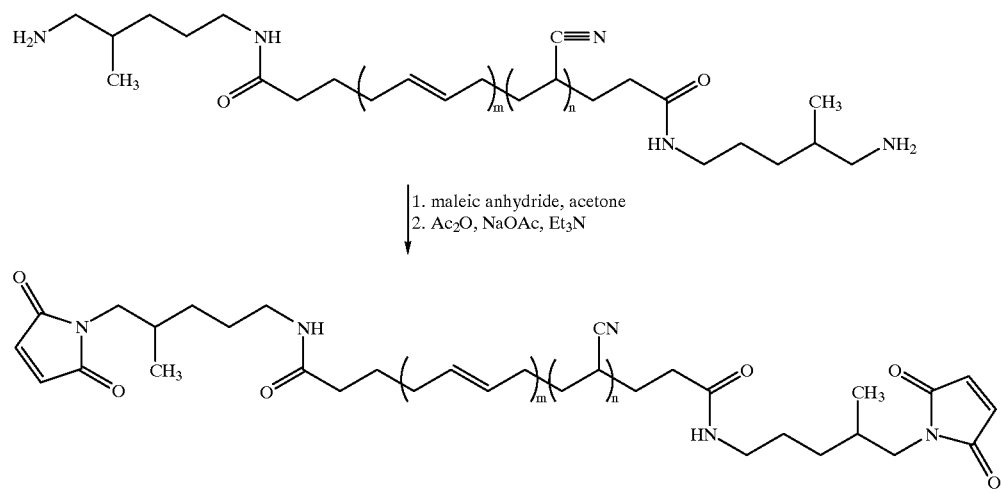

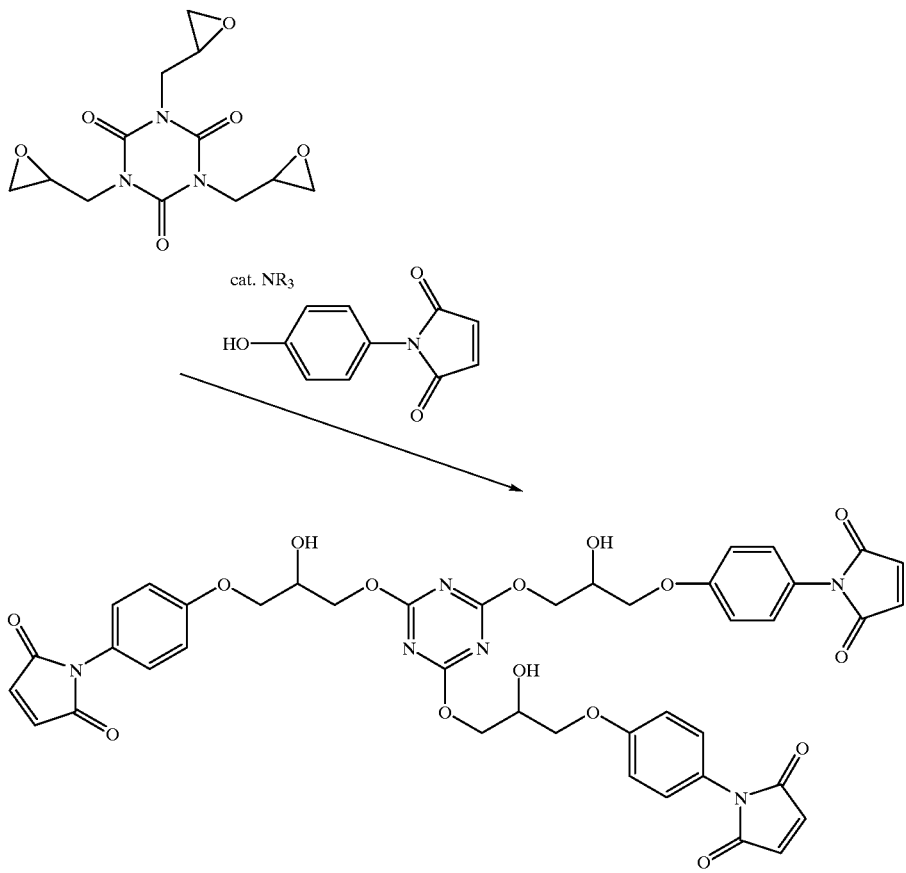

Tris(epoxypropyl)isocyanurate (99.0 g, 0.33 mol) is dissolved in THF (500 mL) in a 2 L three-necked flask equipped with mechanical stirrer, internal temperature probe and nitrogen inlet/outlet. To this solution is added hydroxyphenylmaleimide (189.2 g, 1 mol) and benzyldimethylamine (1.4 g, 0.05 wt. %). The solution is heated to 80° C. for 7 hours. The reaction is allowed to cool to room temperature, is filtered, and the filtrant washed with 5% $HCl_{aq}$ (500 mL) and distilled $H_2O$ (1 L). The resulting solid, triazinetris(maleimide), is vacuum dried at room temperature.

Example 5
Preparation of Maleimidoethylpalmitate

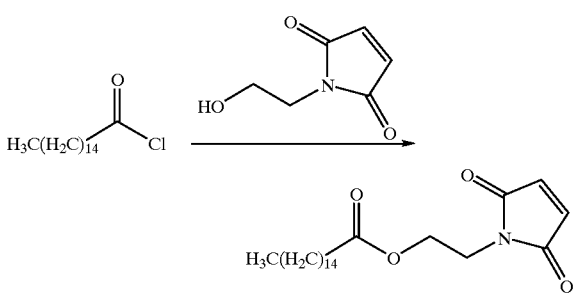

Palmitoyl chloride (274.9 g, 1 mol) is dissolved in $Et_2O$ (500 mL) in a 2 L three-necked flask equipped with mechanical stirrer, internal temperature probe, addition funnel and nitrogen inlet/outlet. $NaHCO_3$ (84.0 g, 1 mol) in distilled $H_2O$ (500 mL) is added with vigorous stirring and the solution cooled on an ice bath under nitrogen. The addition funnel is charged with hydroxyethylmaleimide (141 g, 1 mol) in $Et_2O$ (100 mL) and this solution added to the reaction over a period of 30 minutes, maintaining an internal T<10° C. during the addition. The reaction is stirred for another 30 minutes on ice, then allowed to warm to room temperature and stirred for 4 hours. The reaction is transferred to a separatory funnel and the isolated organic layer washed with distilled $H_2O$ (500 mL), 5% $HCl_{aq}$ (500 mL) and distilled $H_2O$ (2×500 mL). The organics are isolated, dried over $MgSO_4$ anhyd., filtered and solvent removed in vacuo to yield the aliphatic maleimide.

Example 6

Preparation of Bismaleimide Derived from 5-Isocyanato-1-(isocyanatomethyl)-1, 3, 3-trimethylcyclohexane

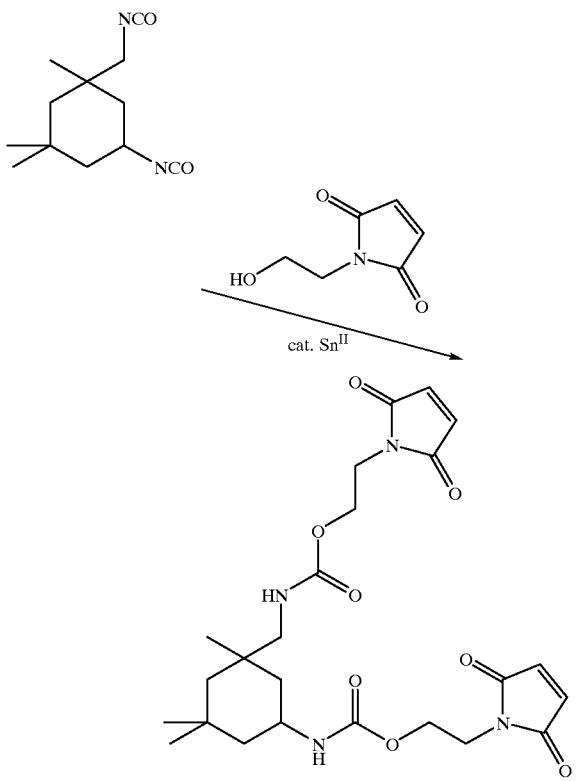

5-Isocyanato-1-(isocyanatomethyl)-1,3,3-trimethylcyclohexane (111.15 g, 0.5 mol) is solvated in THF (500 mL) in a 1 L three-necked flask equipped with mechanical stirrer, addition funnel and nitrogen inlet/outlet. The reaction is placed under nitrogen, and dibutyltin dilaurate (cat. $Sn^{II}$) (6.31 g, 10 mmol) and hydroxyethylmaleimide (141 g, 1 mol) are added with stirring, and the resulting mixture heated for 4 hours at 70° C. The addition funnel is charged with hydroxyethylmaleimide (141 g, 1 mol) dissolved in THF (100 mL). This solution is added to the isocyanate solution over 30 minutes, and the resulting mixture heated for an additional 4 hours at 70° C. The reaction is allowed to cool to room temperature and solvent removed in vacuo. The remaining oil is dissolved in $CH_2Cl_2$ (1 L) and washed with 10% $HCl_{aq}$ (1 L) and distilled $H_2O$ (2×1 L). The isolated organics are dried over $MgSO_4$, filtered and the solvent removed in vacuo to yield the maleimide.

Example 7

Preparation of Dimer Divinyl Ether Derived from Dimer Diol (Pripol 2033)

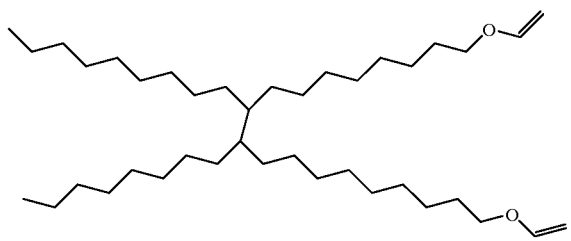

"Dimer Divinyl Ether" (and cyclic isomers)

Bis(1,10-phenanthroline)Pd(OAc)$_2$ (0.21 g, 0.54 mmol) was dissolved in a mixture of butyl vinyl ether (8.18 g, 81.7 mmols), heptane (100 mL) and "dimer diol" (sold as Pripol 2033 by Unichema, 15.4 g, 27.2 mmol) in 2 L three-necked flask equipped with a mechanical stirrer under nitrogen. This solution was heated to light reflux for 6 h. The solution was allowed to cool to room temperature and subsequently poured onto activated carbon (20 g) and stirred for 1 hour. The resulting slurry was filtered, and excess butyl vinyl ether and heptane were removed in vacuo to yield the divinyl ether as a yellow oil. The product exhibited acceptable $^1H$ NMR, FT-IR and $^{13}C$ NMR spectral characteristics. Typical viscosity ~100 cPs.

Example 8

Preparation of Dimer Diacrylate Derived From Dimer Diol (Pripol 2033)

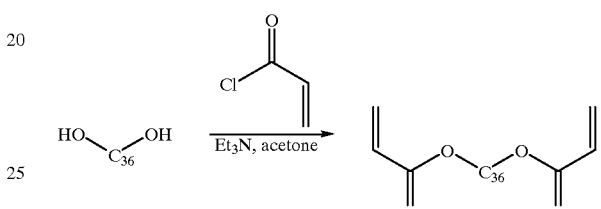

Dimer diol (sold as Pripol 2033 by Unichema, 284.4 g, 500 mmol) is dissolved in dry acetone (500 mL) in a 1 L three-necked flask equipped with mechanical stirrer, addition funnel and internal temperature probe under nitrogen. Triethylamine (101.2 g, 1 mol) is added to this solution and the solution cooled to 4° C. on an ice bath. Acryloyl chloride (90.5 g, 1 mol) solvated in dry acetone (100 mL) is charged into the addition funnel and added to the stirred reaction solution over the course of 60 minutes, maintaining an internal temperature <10° C. This solution is stirred on ice for an additional 2 hours, then allowed to warm to room temperature and stirred for 4 hours. Bulk solvent is removed via a rotary evaporator, and the remaining residue solvated in $CH_2Cl_2$ (1 L). This solution is washed with 5% $HCl_{aq}$ (800 mL), and $H_2O$ (2×800 mL). The isolated organics are dried over $MgSO_4$ anhyd. and filtered, and the solvent removed in vacuo to yield the diacrylate as an oil.

Example 9

Preparation of N-ethylphenyl Maleimide

4-Ethyl aniline (12.12 g) was dissolved in 50 ml of anhydrous ethyl ether and slowly added to a stirred solution of 9.81 g of maleic anhydride in 100 ml of anhydrous ethyl ether chilled in an ice bath. After completion of the addition, the reaction mixture was stirred for 30 minutes. The light yellow crystals were filtered and dried. Acetic anhydride (200 ml) was used to dissolve the maleamic acid and 20 g of sodium acetate. The reaction mixture was heated in an oil bath at 160° C. After 3 hours of reflux, the solution was cooled to room temperature, placed in a 1 L beaker in ice water and stirred vigorously for 1 hour. The product was suction-filtered and recrystallized in hexane. The collected crystalline material was dried at 50° C. in a vacuum oven overnight. FTIR and NMR analysis showed the characteristics of ethyl maleimide.

Example 10
Preparation of Bis(alkenylsulfide)

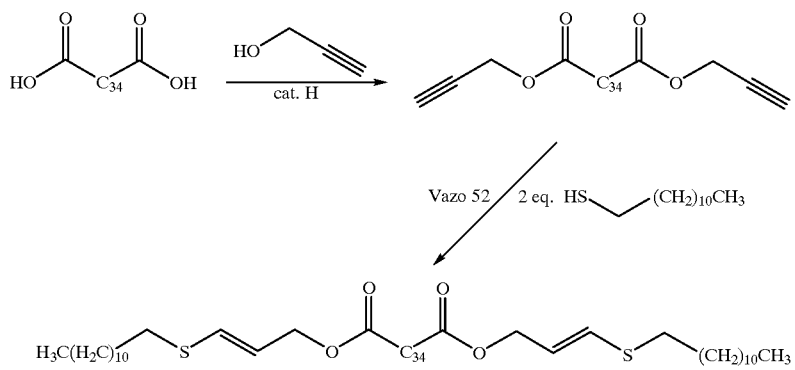

Dimer acid (sold under the trademark Empol 1024 by Unichema) (574.6 g, 1 mol) and propargyl alcohol (112.1 g, 2 mol) are solvated in toluene (1 L) in a 3 L three-necked flask equipped with mechanical stirring and a Dean-Stark distillation apparatus. Concentrated $H_2SO_4$ (6 mL) is added and the solution refluxed for 6 hours until 36 mL of $H_2O$ is azeotropically distilled. The solution is allowed to cool to room temperature, washed with $H_2O$ (2×1 L), dried over $MgSO_4$ anhyd. and solvent removed in vacuo to yield the propargyl ester intermediate as an oil.

This ester intermediate (650.7 g, 1 mol) is solvated in THF (200 mL) in a 1 L three-necked flask equipped with reflux condensor, mechanical stirrer and internal temperature probe under nitrogen. Lauryl mercaptan (404.8 g, 2 mol) and 2,2'-azobis(2,4-dimethylpentanenitrile) (sold under the trademark Vazo 52 by DuPont, 11 g) are added and the resulting mixture heated to 70° C. on an oil bath with stirring for 7 hours. The reaction is allowed to cool to room temperature and solvent removed in vacuo to yield the alkenyl sulfide as an oil.

Example 11
UV Curable Compositions

Composition 11-A

A composition was prepared by combining the following ingredients with vigorous manual mixing until a homogenous paste was obtained:

| Ingredient | Amount |
|---|---|
| Bismaleimide (prepared from polytetramethylene oxide-di-p-aminobenzoate, sold as Versalink P-650 by Henkel) | 1.01 g |
| Cyclohexanedimethanol divinylether (International Specialty Products): | 0.19 g |
| α,α-Dimethoxy-α-phenylacetophenone (sold as Irgacure 651 by Ciba Specialty Chemicals) | 0.06 g |
| Hydrophilic Fused Silica (sold by Denka, ~5 micron) | 3.78 g |

This composition was tested for UV cure by using the composition to bond a 250 mil×250 mil silicon die on FR-4 laminate. The composition was irradiated for 30 seconds using a pulsed xenon UV source (RC-500B Pulsed UV Curing System, Xenon Corporation). The cured composition exhibited a hard, fully cured surface and held the die firmly to the laminate material when force was applied. The sample assembly was subsequently placed in a 175° C. oven for 20 minutes. The die was allowed to cool to room temperature and then forcibly removed from the laminate. No regions of uncured composition were detected around the die edge, the laminate/adhesive interface or the adhesive/air surface interface.

Example A
Preparation of 6-maleimidocaproic acid

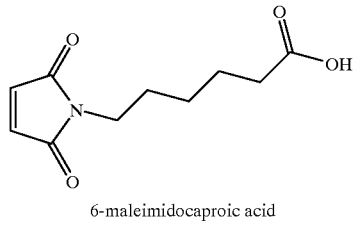

6-maleimidocaproic acid

The acid functional maleimide, 6-maleimidocaproic acid, was synthesized using known methodology.[1] Aminocaproic acid (100 g, 7.6×10$^{-1}$ mols) was dissolved in glacial acetic acid (50 mL) in a 500 mL four-necked flask equipped with mechanical stirring, an internal temperature probe and an addition funnel. The addition funnel was charged with a solution of maleic anhydride (74.8 g, 7.6×10$^{-1}$ mols) dissolved in acetonitrile (75 mL). This solution was added to the aminocaproic acid at room temperature dropwise over 1 hour, maintaining an internal reaction temperature less than 35° C. The reaction was stirred for three hours after the addition was complete. The reaction slurry was filtered, and the isolated filtrate was dried in a vacuum oven (P~25 T) overnight at 70° C. to yield 166 g of off white solid (95%). The product amic acid exhibited FT-IR and $^1$H NMR spectral characteristics consistent with literature data.

The amic acid described above (166 g, 7.2×10$^{-1}$ mols) was solvated in a solution of toluene (200 mL), benzene (200 mL) and triethylamine (211 mL, 1.51 mol) in a 1 L three-necked flask equipped with mechanical stirring and a Dean-Stark trap under nitrogen. This solution was heated to reflux for 4 h and the water produced collected in the Dean-Stark trap. Distilled water (400 mL) was added to the reaction flask to dissolve the triethylammonium salt of the product which largely separated from the bulk solution during the reaction. This aqueous layer was isolated, acidified to pH~1 with 50% HCl, and extracted with ethyl acetate (600 mL). This organic layer was washed with distilled water (400 mL). The isolated organic layer was dried over $MgSO_4$, followed by solvent removal in vacuo to yield an off white solid (76.2 g, 50%). The product 6-maleimidocaproic acid was spectrographically identical to literature material by FT-IR and $^1$H NMR.

Example B
Preparation of "Dimer Diester Bismaleimide"

The general procedure described in Example B. was applied substituting decane diol (29.5 g, $1.69 \times 10^{-1}$ mols) for Pripol 2033. This process yielded a solid, moderately soluble bismaleimide (54.9 g, 58%). The product exhibited satisfactory FT-IR and $^1$H NMR data.

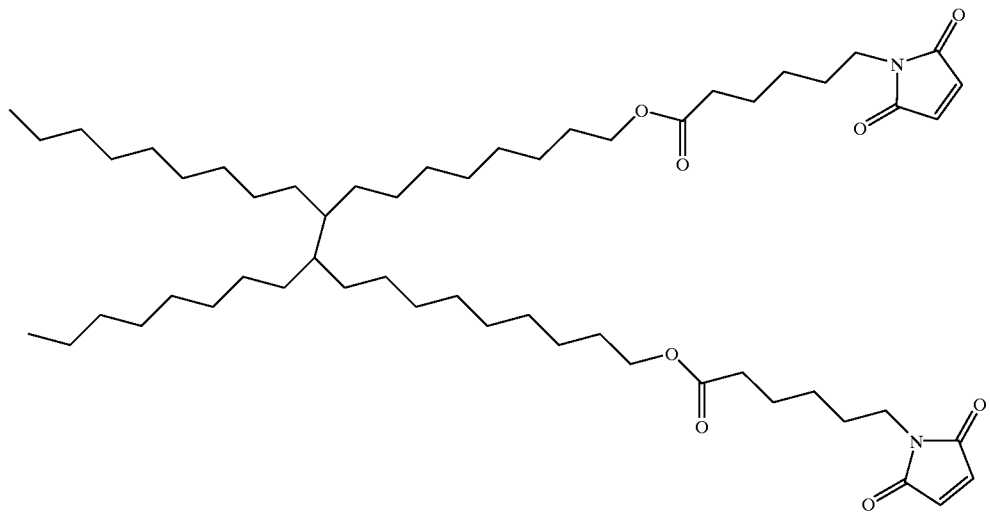

"Dimer Diester Bismaleimide" (and cyclic isomers)

Pripol 2033 ("dimer diol", Uniqema, 92.4 g, $1.69 \times 10^{-1}$ mols), 6-maleimidocaproic acid (75.0 g, $3.55 \times 10^{-1}$ mols) and H$_2$SO$_4$ (0.50 mL, $\sim 8.5 \times 10^{-3}$ mols) were slurried in toluene (300 mL) in a 1 L four-necked flask equipped with mechanical stirrer, a Dean-Stark trap and an internal temperature probe under nitrogen. The reaction was heated to light reflux for two hours and the water evolved collected in the Dean-Stark trap. The trap was drained and ~50 mL of toluene solvent was distilled off of the reaction to remove trace moisture and drive the esterification equilibrium to completion. The reaction was allowed to cool to room temperature, additional toluene (100 mL) was added (on the laboratory scale it is preferable to add diethyl ether in place of toluene at this point), and the solution was washed with saturated NaHCO$_3$ aq. (300 mL) and distilled water (300 mL). The organic layer was isolated and dried over anhydrous MgSO$_4$, and the solvent removed in vacuo to yield an orange oil (107.2 g, 68%). The material can be further purified by eluting a toluene solution of the resin through a short plug of silica or alumina. This liquid bismaleimide resin exhibited acceptable FT-IR, $^1$H NMR, and $^{13}$C NMR data. Typical $\eta \sim 2500$ cPs.

Example C
Preparation of "Decane Diol Diester Bismaleimde"

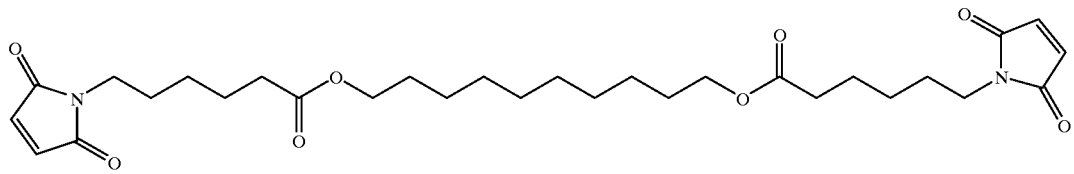

"Decane Diol Diester Bismaleimide"

Example D
Preparation of "Glycerol Triester Tris(maleimide)"

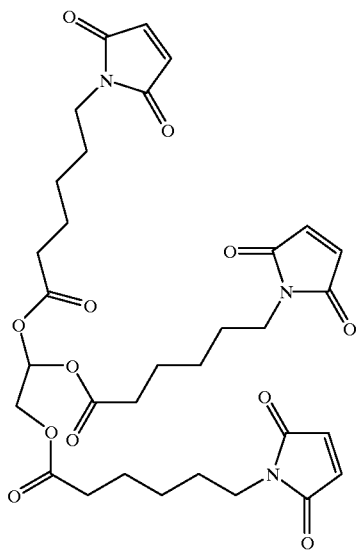

The protocol outlined in example B. was utilized substituting glycerol 5 (10.4 g, $1.13 \times 10^{-1}$ mol) for Pripol 2033. The product was a viscous liquid which exhibited acceptable FT-IR and $^1$H NMR data.

Example E
Preparation of "Bis(m-nitrobenzyl carbamate) of IPDI"

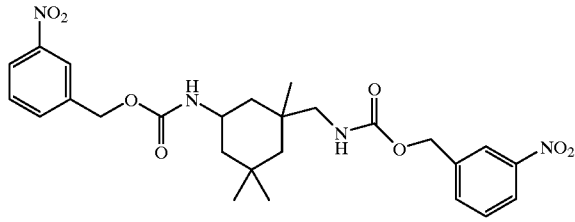

"Bis(*m*-nitrobenzyl carbamate) of IPDI"

Isophorone duisocyanate ("IPDI", 100.0 s, $4.5 \times 10^{-1}$ mols), m-nitrobenzyl alcohol (137.8 g, $9.0 \times 10^{-1}$ mols) and dibutyl tin dilaurate (2.8 g, $4.5 \times 10^{-3}$ mols) were solvated in dry toluene (1500 mL) in a 2 L three-necked flask equipped with mechanical stirrer, reflux condensor and internal temperature probe under nitrogen. The resulting solution was heated to 90° C. for 4 h. No isocyanate band was observed in the IR of the solids portion of the sample. The solution was allowed to cool to room temperature and washed with distilled H$_2$O (100 mL). The organic layer was isolated and solvent removed in vacuo to yield a yellow liquid which exhibited acceptable FT-IR and $^1$H NMR characteristics.

Example F
Preparation of "Bis(m-aminobenzyl carbamate) of IPDI"

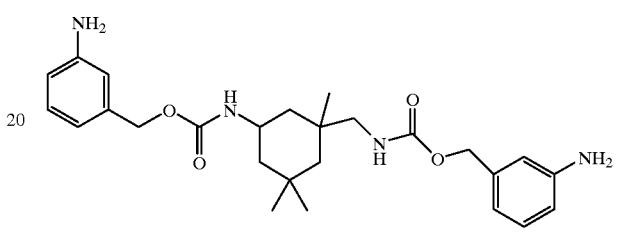

"Bis(*m*-aminobenzyl carbamate) of IPDI"

The dinitro compound from Example E. (8.28 g, $1.57 \times 10^{-2}$ mols) was dissolved in ethanol (100 mL) in a 500 mL three-necked round bottom flask equipped with magnetic stirring under nitrogen. Cyclohexene (28.6 mL, $2.82 \times 10^{-1}$ mols) was added, followed by 5% Pd/C (4.14 g). The resulting slurry was refluxed lightly for 6.5 h. The FT-IR of a filtered aliquot of this solution exhibited no nitro stretching bands at 1529 cm$^{-1}$ and 1352 cm$^{-1}$. The bulk solution was allowed to cool to room temperature and filtered. Solvent was removed in vacuo to yield a yellow semisolid (6.6 g, 90%) which exhibited acceptable FT-IR and $^1$H NMR spectral characteristics.

Example G

Preparation of "Bis(m-maleimidobenzyl carbamate) of IPDI"

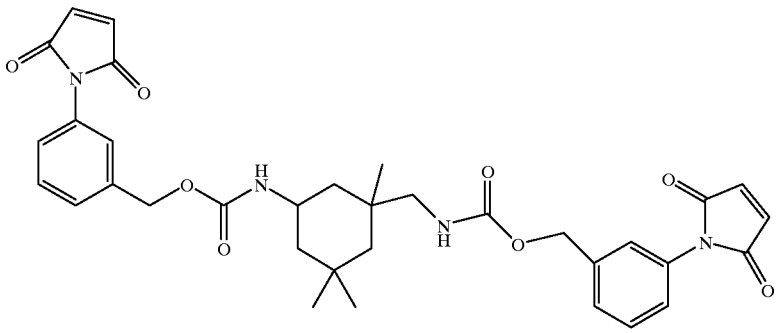

"Bis(*m*-maleimidobenzyl carbamate) of IPDI"

The diamine from Example F (6.6 g, $1.41\times1^{-2}$ mols) was solvated in acetone (60 mL) in a 250 mL four-necked flask equipped with magnetic stirrer and addition funnel under nitrogen and cooled to 4° C. Maleic anhydride (2.76 g, $2.82\times10^{-2}$ mols) dissloved in acetone (20 mL) was added over the course of 30 minutes. The resulting solution was stirred at 4° C. for for 1 h, and subsequently was allowed to warm to room temperature and stirred overnight. FT-IR analysis indicated no maleic anhydride remained as judged by the absence of the anhydride stretching band at ~1810 $cm^{-1}$.

To the above amic acid solution was added acetic anhydride (8.5 mL, $9.0\times10^{-2}$ mols), triethylamine (1.26 mL, $9.0\times10^{-3}$ mols) and sodium acetate (0.88 g, $1.1\times10^{-2}$ mols). The resulting solution was refluxed lightly for 4 h under nitrogen. The reaction was allowed to cool to room temperature and bulk solvent was removed in vacuo. The resulting viscous liquid was resolvated in methylene chloride (200 mL) and extracted with distilled water (3×200 mL). The organics were then dried over $MgSO_4$ anhyd., filtered and solvent removed in vacuo to yield a light brown solid (6.75 g, 76%). This material exhibited acceptable FT-IR and $^1H$ NMR spectral features.

Example H
Preparation of "Bis(m-nitrobenzyl carbamate) of DDI 1410"

DDI 1410 (Henkel, "Dimer Diisocyanate", 99.77 g, $1.65\times10^{-1}$ mols based on 13.96% NCO), m-nitrobenzyl alcohol (50.8 g, $3.32\times10^{-1}$ mols) and dibutyltin dilaurate (0.5 mL, $8.3\times10^{-4}$ mols) were solvated in toluene (150 mL) in a 1 L four-necked flask equipped with mechanical stirrer, reflux condensor and internal temperature probe under nitrogen. The reaction was heated to 85° C. for 2.5 h. FT-IR analysis of an aliquot of the reaction indicated complete comsumption of isocyanate functionality as judged by the lack of a band at 2272 $cm^{-1}$. Solvent was removed from the reaction in vacuo to yield a yellow oil which solidified upon standing at room temperature (152.4 g, 102% (trace toluene)). This solid exhibited satisfactory FT-IR and $^1H$ NMR spectral features.

Example I

Preparation of "Bis(m-aminobenzyl carbamate) of DDI 1410"

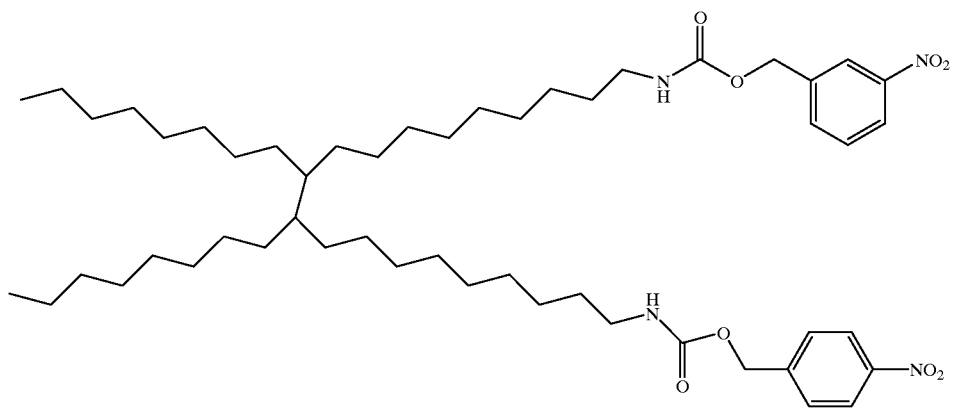

"Bis(m-nitrobenzyl carbamate) of DDl 1410" (and cyclic isomers)

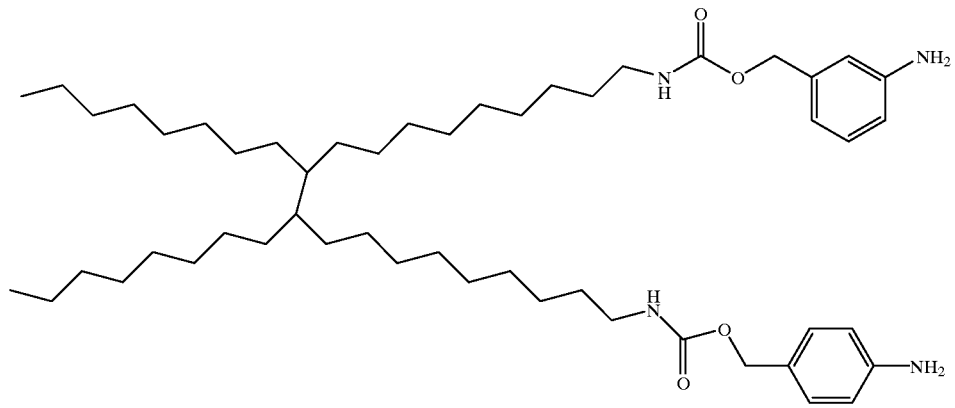

"Bis(m-aminobenzyl carbamate) of DDl 1410" (and cyclic isomers)

The diamine product of Example H (39.6 g, 4.32×10⁻² mols) and stannous chloride dihydrate (97.55 g, 4.32×10⁻¹ mols) were slurried in ethyl acetate (300 mL) in a 1 L three-necked flask equipped with mechanical stirrer and a reflux condensor under nitrogen. The reaction was heated to light reflux and stirred vigorously for 3 h. The solution was allowed to cool to room temperature and brought to pH 7–8 with a solution of saturated sodium bicarbonate. The mixture was pushed through a 25 micron filter to yield a mixture which separated into a cloudy aqueous layer and a moderately clear organic layer. The aqueous layer was isolated and washed with ethyl acetate (100 mL). The organic layers were combined, washed with distilled water (300 mL) and dried over anhydrous MgSO₄. The slurry was filtered and solvent removed from the filtrate in vacuo to yield yellow, sticky solid (33.8 g, 92%).

Example J

Preparation of "Bis(m-maleimidobenzyl carbamate) of DD 11410"

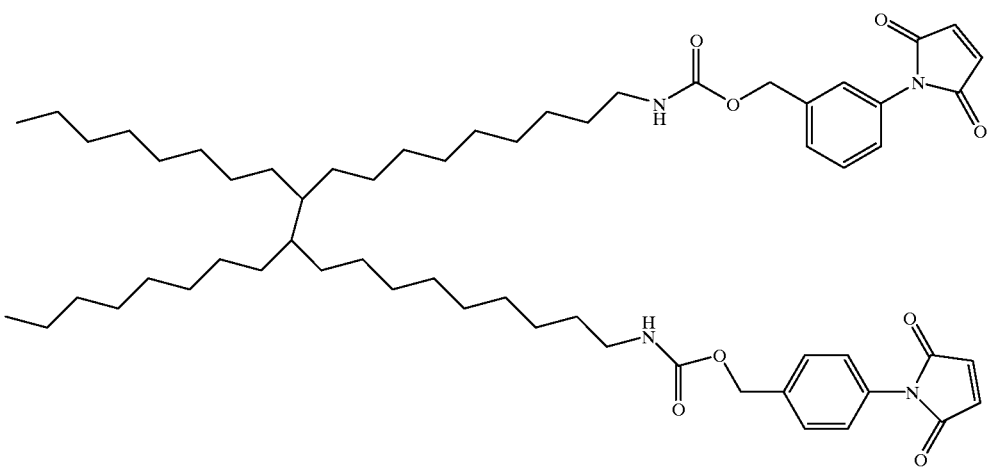

"Bis(m-maleimidobenzyl carbamate) of DDl 1410" (and cyclic isomers)

Maleic anhydride (15.4 g, 1.57×10⁻² mols) was dissolved in acetone (300 mL) in a 2 L four-necked flask equipped with mechanical stirrer, internal temperature probe and addition funnel under nitrogen. This solution was cooled to ~4° C. on an ice bath. A solution of the diamine prepared in Example I (63.4 g, 7.48×10⁻² mols) in acetone (70 mL) was charged to the addition funnel and added to the maleic anhydride solution over a period of 30 minutes maintaining an internal temperature of <10° C. The resulting solution was stirred for 1 h and subsequently allowed to warm to room temperature and stir for 2 h.

To this solution of amic acid was added acetic anhydride (24.7 mL, 2.62×10⁻¹ mols), triethylamine (6.25 mL, 4.48× 10⁻² mols) and manganese acetate tetrahydrate (0.37 g, 1.50×10⁻³ mols). This solution was heated to light reflux for 6.5 h, then allowed to cool to room temperature. Bulk solvent was removed in vacuo, and the resulting dark liquid was dissolved in diethyl ether (500 mL). This solution was washed with dist. H₂O (500 mL). The isolated organic layer was then washed with saturated NaHCO₃ aq. (500 mL) and again with dist. H₂O (500 mL). The organics were isolated, dried over anhyd. MgSO₄, and solvent removed in vacuo to yield a viscous orange oil. This material exhibited FT-IR, ¹H NMR and ¹³C NMR spectral features consistent with the expected bismaleimide product.

What is claimed is:

1. A curable composition for preparing a circuit component on a printed wire board, the curable composition comprising a maleimide compound and a curing initiator selected from the group consisting of a free-radical initiator, a photoinitiator, and a combination of those, in which the maleimide has the structure:

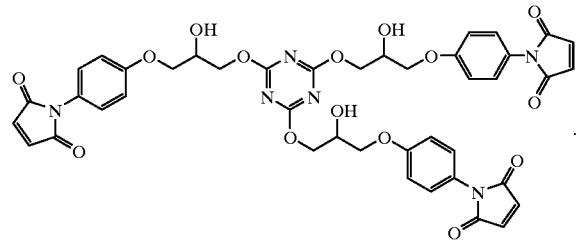

2. A curable composition for preparing a circuit component on a printed wire board, the curable composition comprising a maleimide compound and a curing initiator selected from the group consisting of a free-radical initiator, a photoinitiator, and a combination of those, in which the maleimide has the structure:

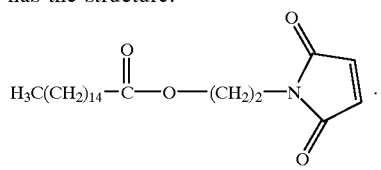

3. A curable composition for preparing a circuit component on a printed wire board, the curable composition comprising a maleimide compound and a curing initiator selected from the group consisting of a free-radical initiator, a photoinitiator, and a combination of those, in which the maleimide has the structure:

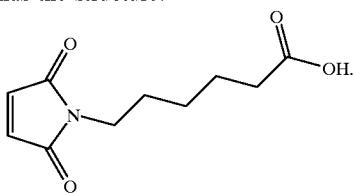

4. A curable composition for preparing a circuit component on a printed wire board, the curable composition comprising a maleimide compound and a curing initiator selected from the group consisting of a free-radical initiator, a photoinitiator, and a combination of those, in which the maleimide has the structure:

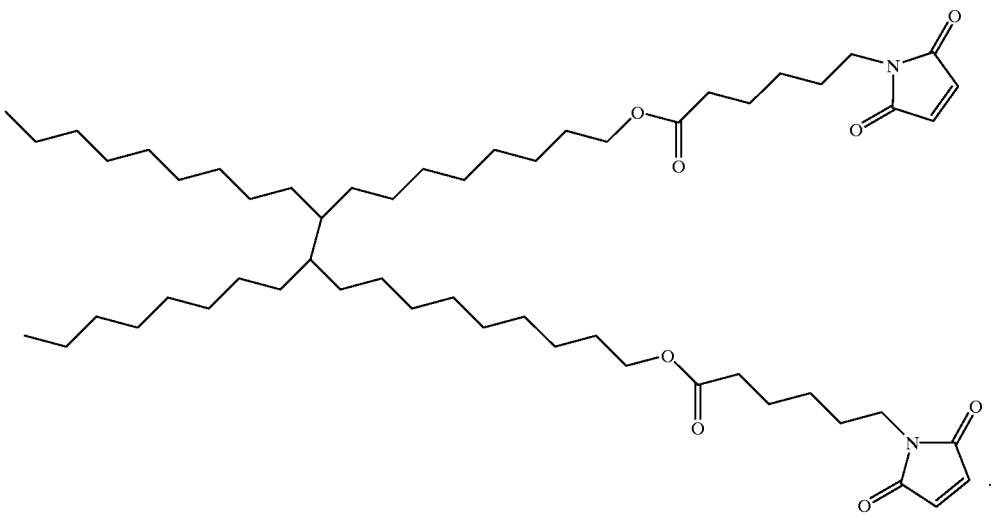

5. A curable composition for preparing a circuit component on a printed wire board, the curable composition comprising a maleimide compound and a curing initiator selected from the group consisting of a free-radical initiator, a photoinitiator, and a combination of those, in which the maleimide has the structure:

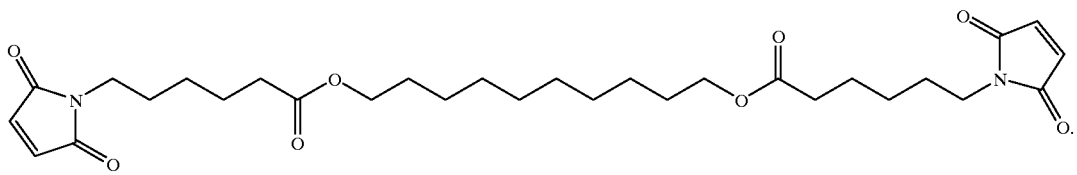

6. A curable composition for preparing a circuit component on a printed wire board, the curable composition comprising a maleimide compound and a curing initiator selected from the group consisting of a free-radical initiator, a photoinitiator, and a combination of those, in which the maleimide has the structure:

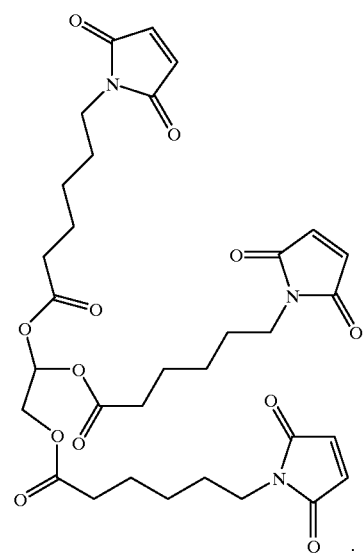

7. A circuit component prepared from a composition according to any one of the preceding claims.

* * * * *